United States Patent [19]

Vercellotti et al.

[11] 4,017,766

[45] Apr. 12, 1977

[54] INVERSE TIME-OVERCURRENT RELAY USING SUCCESSIVE LINEAR APPROXIMATIONS

[75] Inventors: Leonard C. Vercellotti, Verona; Shan C. Sun, Pittsburgh, both of Pa.

[73] Assignee: Westinghouse Electric Corporation, Pittsburgh, Pa.

[22] Filed: Aug. 4, 1975

[21] Appl. No.: 601,898

[52] U.S. Cl. .............................. 361/83; 307/229; 328/142; 361/3

[51] Int. Cl.² ...................................... H01H 47/18

[58] Field of Search ........... 317/36 TD, 38; 328/14, 328/142, 144, 145, 146; 307/229, 235 P

[56]       References Cited
       UNITED STATES PATENTS 3,079,533   2/1963   Kotheimer ...................... 317/38 X
3,444,434   5/1969   Zocholl ........................ 317/36 TD
3,831,061   8/1974   Boyd ............................ 317/36 TD

*Primary Examiner*—Harry Moose
*Attorney, Agent, or Firm*—S. A. Seinberg

[57]       ABSTRACT

The disclosure relates to a time-overcurrent relay utilizing successive linear time-current segments which approximate a non-linear, inverse time-current curve the linear segments are determined by subtracting a series of ramp like voltages of increasing magnitudes from a series of bias voltages, each of which is of substantially constant magnitude and which bias voltage magnitudes decrease in sequence by the peak magnitude of the preceding ramp voltage.

15 Claims, 7 Drawing Figures

INVERSE TIME-OVERCURRENT RELAY USING SUCCESSIVE LINEAR APPROXIMATIONS

BACKGROUND OF THE INVENTION

It is a commonly accepted practice in the electrical arts to provide a current relay which will have an inverse time-current characteristic. This has in the past usually been accomplished by electromechanical switch means and has resulted in the development of generally accepted families of time-current characteristic curves which may vary from a slightly inverse to an extremely inverse time-current characteristic.

SUMMARY OF THE INVENTION

Solid state electronics have many desirable characteristics, such as requiring less power for their operation and a consequent lessening of the burden imposed on the circuits being protected. In accordance with the teachings herein, the non-linear curve is broken up into a series of linear segments which are readily and economically attained with solid state electronics. This is accomplished by dividing the time axis of the non-linear curve into a desired number of time intervals and approximating the non-linear curve with linear segments extending between the intersections of the time points with the non-linear time-current curve.

The time-current curve is usually plotted as time against the number of pick-up values of the current to be monitored. The current magnitude is usually sensed by a network which will produce an input voltage quantity C which has a magnitude which represents the current magnitude and a voltage scale may be substituted for the pick-up value scale. When the current magnitude reaches a predetermined number of multiples of pick-up, the trip output of the relay should be "instantaneous" with no programmed time interval. This pick-up magnitude will provide an established input voltage for any given current to-voltage ratio. An extrapolation of the usual electromechanical relay curve to this pick-up value, as well as to the 1 unit of pick-up current value, will normally be required. This establishes the magnitude of the input voltage C which must be equalled for the relay to trip with no programmed delay and to trip with the maximum delay at just over 1 unit of pick-up value.

In accordance with our invention, this input voltage is compared with two voltages A and B generated within the relay itself. One of these generated voltages A comprises a number of constant value or bias segments, one for each time interval starting with a segment of a magnitude equal to the magnitude of the voltage C for an instantaneous trip. The second B of the generated voltages comprises a series of voltages, one for each time interval, having magnitudes which will change in magnitude from an initial to a final magnitude during each time interval by an amount equal to the change in magnitude of the curve during each of the time intervals of the linear segments. It will be appreciated that with inverse, time-overcurrent curves, this will mean the greatest change in magnitude of the voltage B occurs during the first time interval and progressively decreasing changes in magnitude occur as the number of the time intervals increases.

At the end of each time interval, the magnitude of the voltage B returns to its initial value and the magnitude of the voltage A is reduced by the peak value of the voltage B during the just-elapsed time interval. When the magnitude of the combined voltages A and B equals the magnitude of the voltage C, the relay will trip.

Since the change in voltage B will reduce the voltage A, the combined value may be considered as A-B. The combined value reaches trip magnitude when the magnitude of the voltages A-B equals the magnitude of the voltage C and may be stated by the mathematical quantity $A - B = C$. It will be apparent that this relationship may be restated as $A = B + C$ or as $B = A - C$.

DESCRIPTION OF THE PREFERRED EMBODIMENTS

Figure 1:
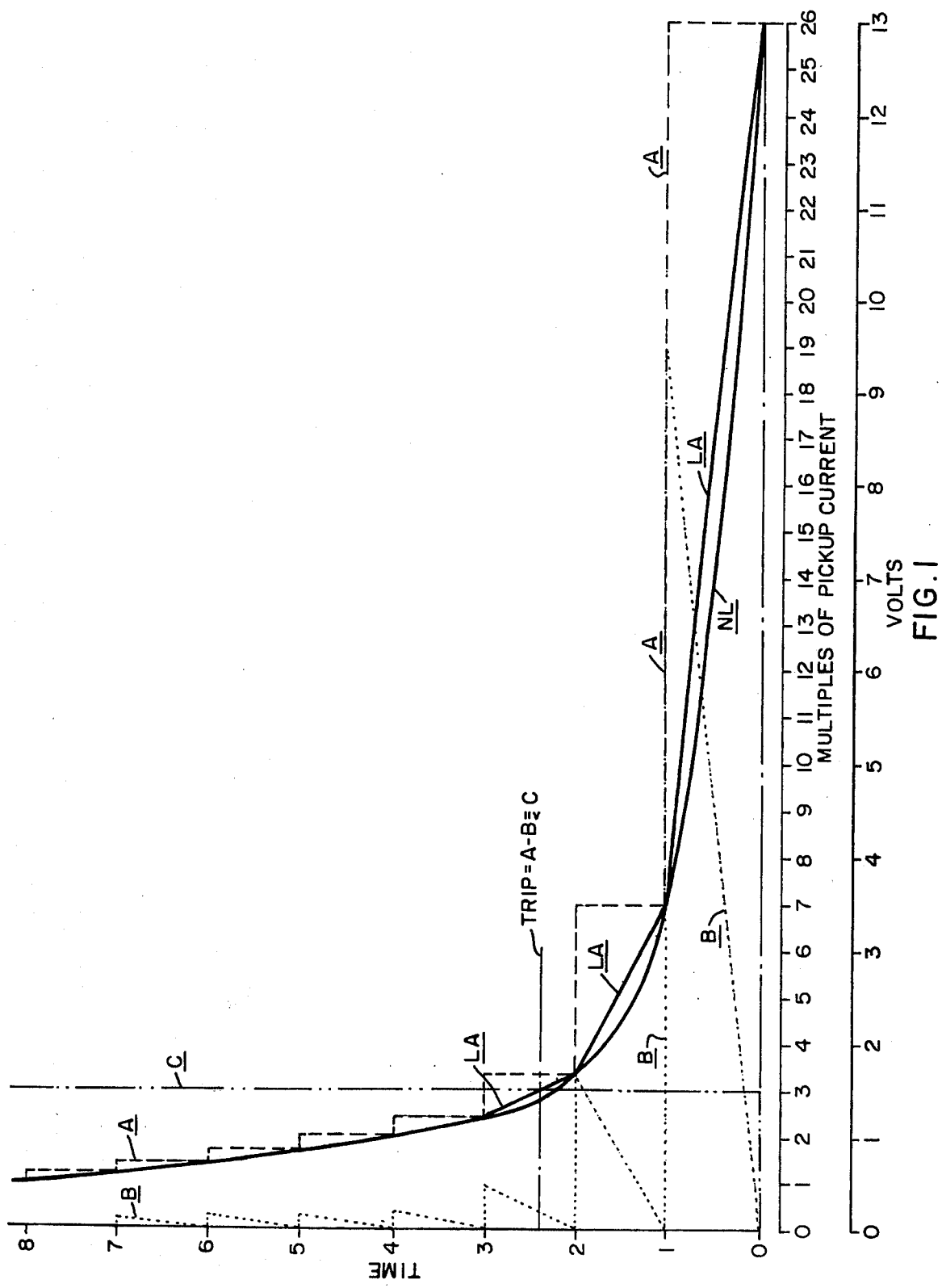
FIGS. 1, 2 and 3 are curves illustrating the time-voltage (magnitude of pick-up current) magnitudes when combined as $A - B = C$, $B + C = A$, and $A - C = B$ respectively.

Referring to the drawings by characters of reference, the character NL designates a desired non-linear, time-current curve which is to substantially be duplicated by the relay of the present invention. This curve is normally plotted with the abscissa representing current and the ordinate representing time. The abscissa may be rescaled in terms of the magnitude of the voltage developed at each of the current multiple, in this case, 0 to 13 volts for 0 to 26 multiples of pick-up current. The ordinate is rescaled in equal intervals or steps, commencing with the time at the pick-up current value for instantaneous trip, which are shown as being light intervals to agree with the eight steps performed by the relays 30 and 30' of FIGS. 4 and 5. A greater number of steps will increase the accuracy since the linear approximations LA will more nearly lie on the curve NL. While the preferred forms of the relays utilize equal time increments and require less complicated apparatus than would be required if the intervals or increments were unequal, such inequality can be implemented. When this is done, modifications will be required which will cause the preferred embodiments to become more complicated, but which may be made by those skilled in the art in accordance with the teachings of the illustrated embodiments.

The stepped curve A represents the magnitudes of a bias voltage and consists of constant value steps. Initially, its magnitude is the magnitude of the voltage established by the magnitude of the line current when "instantaneous" tripping is desired. This is designated as time 0. At time 1, the magnitude reduces to the magnitude corresponding to that of the curve NL. Similarly, the magnitude of the bias voltage drops in steps at the time 2, 3, 4, etc., until the breaker in the controlled power line opens and reduces the voltage C developed in consequence of the power line current. The sequencing stops when the magnitude of C is reduced below the 1 pick-up current multiple as will be explained below.

The curve B represents the slope segment voltage and is shown as having an initial value of zero and a peak value equal to the change in volts along the curve NL during the respective time interval. During the time interval 0–1, it will increase in magnitude from zero to 9.5 volts. During subsequent time intervals, the increase will be less as illustrated. The slope voltage B when subtracted from the bias voltage A will provide the time voltage relationship LA.

Figure 4:
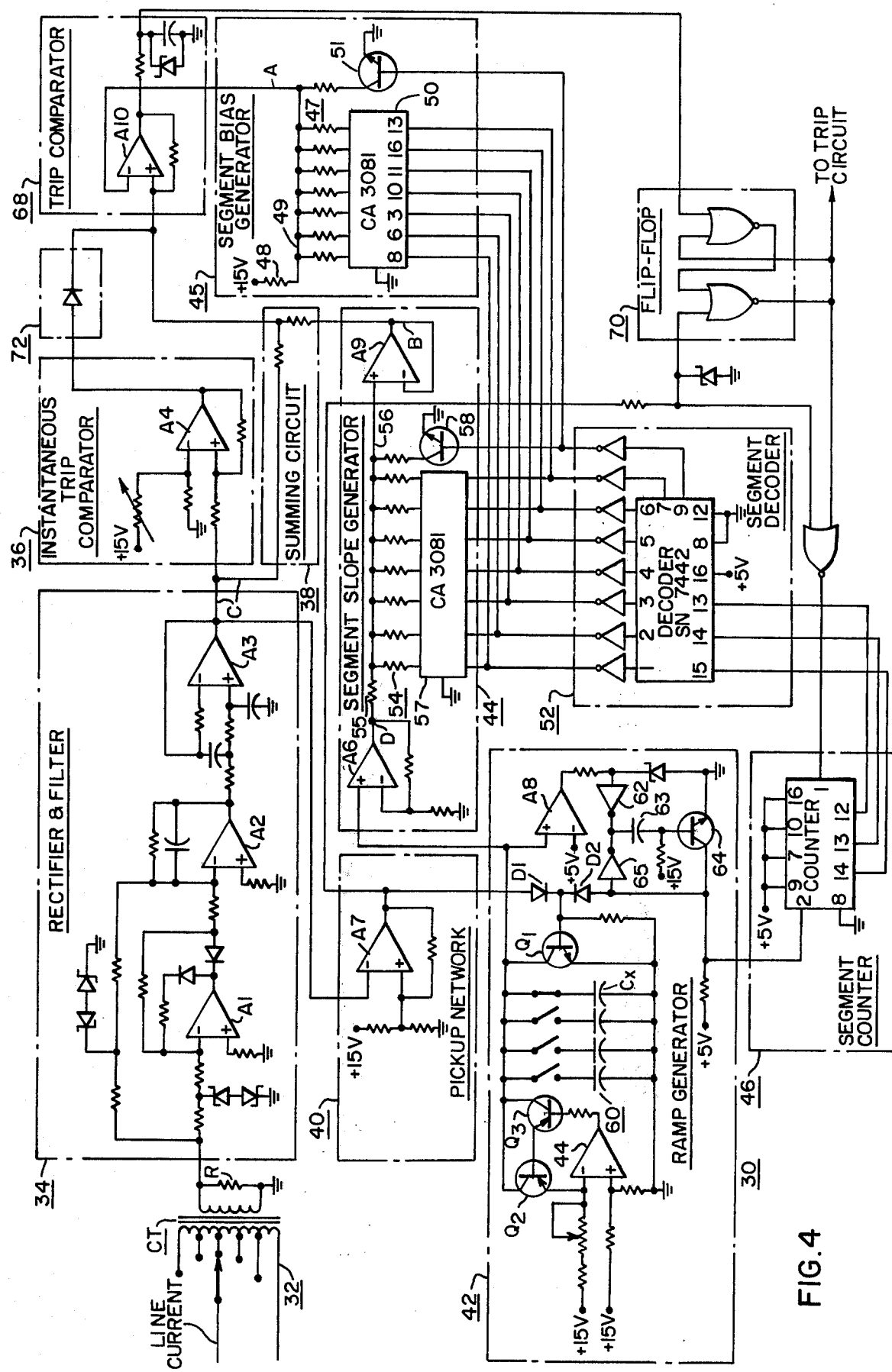
FIG. 4 is a schematic diagram illustrating a first preferred form of a solid state relay embodying the invention in the form $B + C = A$.
Figure 5:
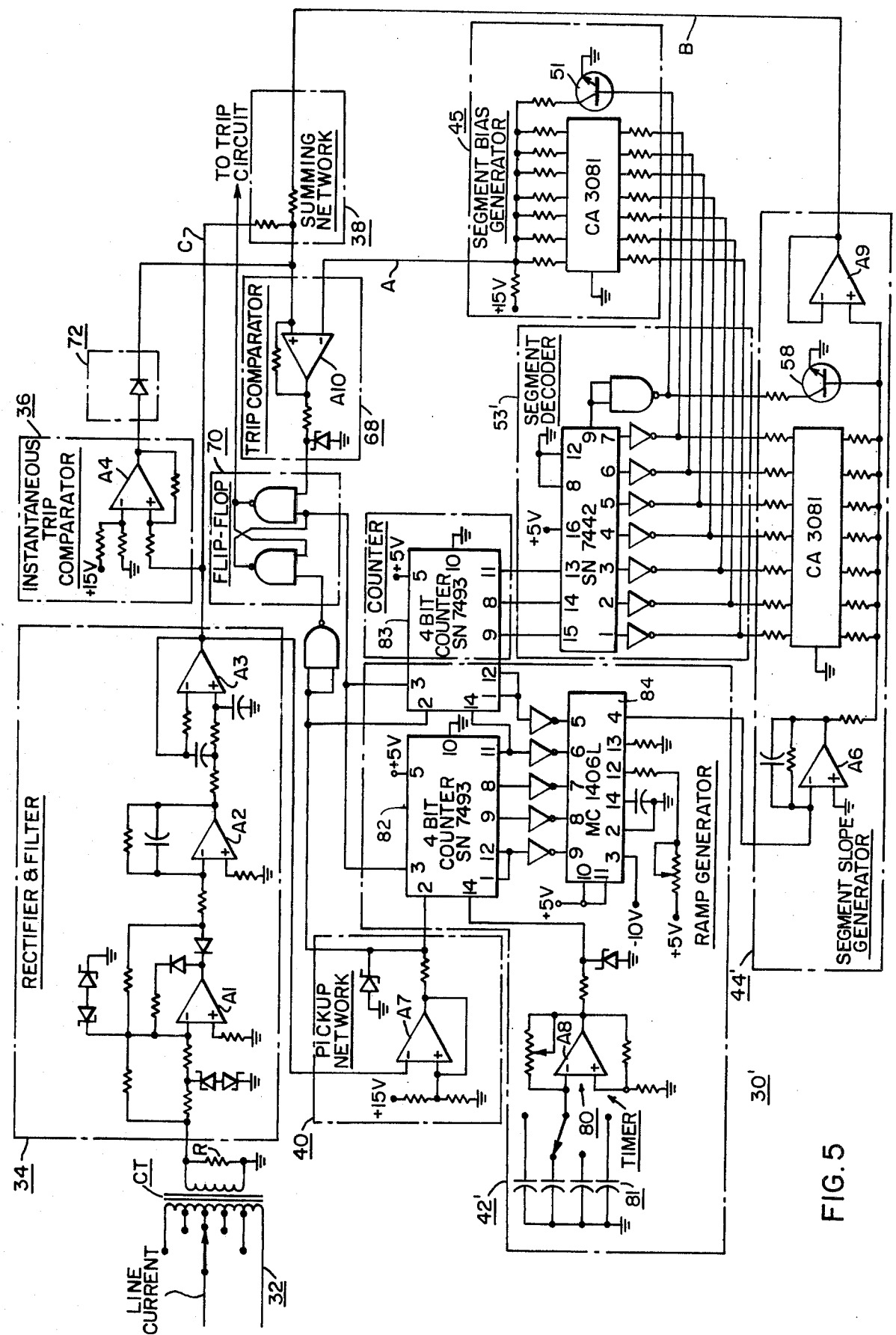
FIG. 5 is a schematic diagram illustrating a second preferred form of a solid state relay embodying the invention also in the form $B + C = A$.
Figure 6:
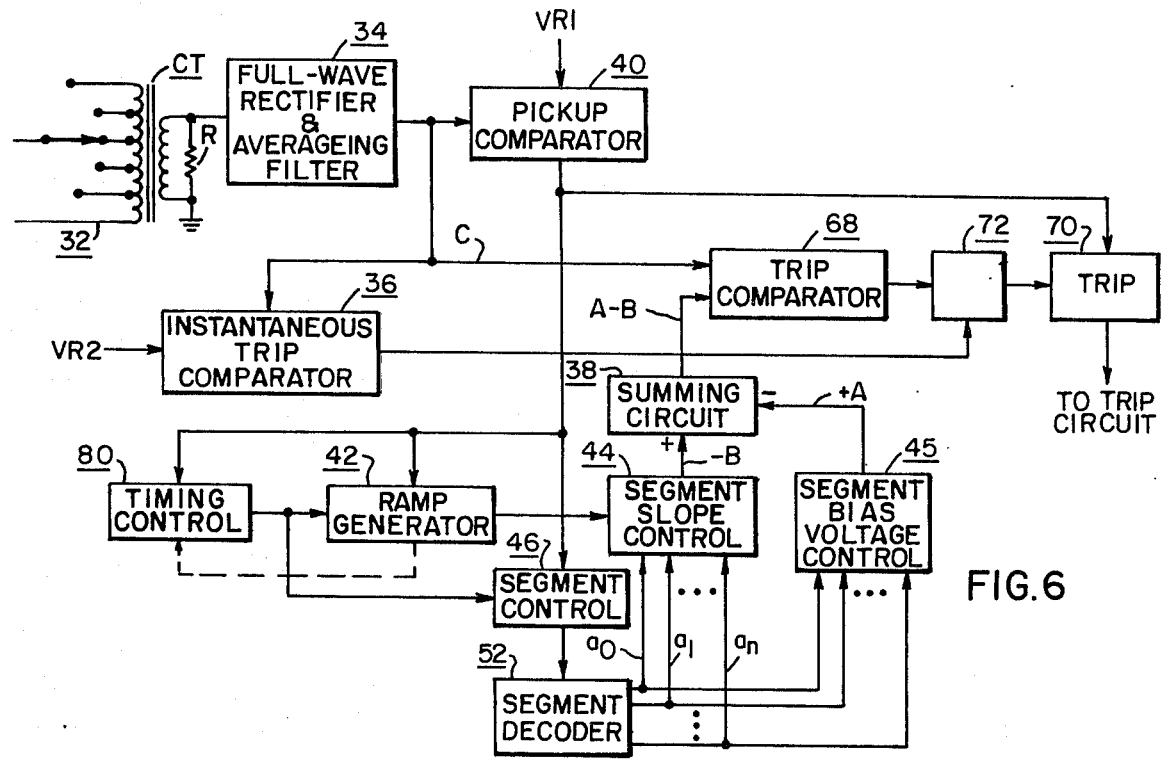
FIGS. 6 and 7 are block diagrams illustrating a solid state relay embodying the invention in the forms $A - B = C$ and $A - C = B$, respectively.
Figure 7:
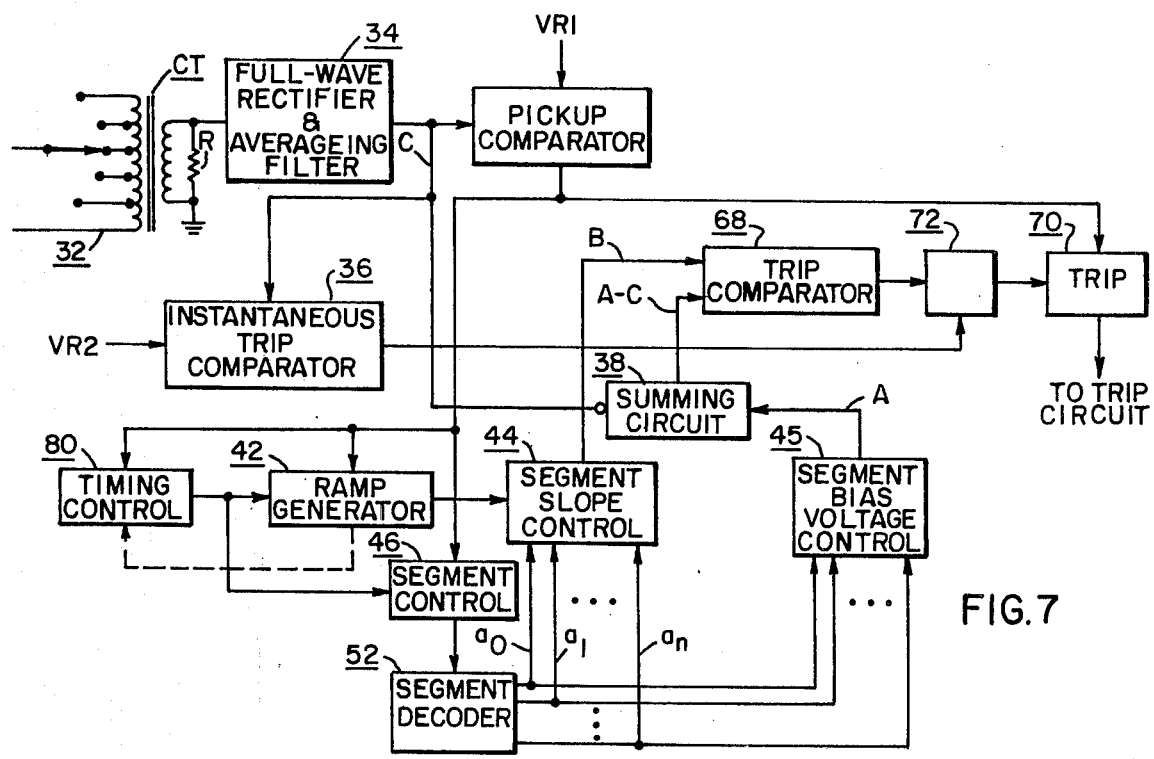

The embodiments of FIGS. 4 and 5 utilize the curve relationship $B + C = A$ for controlling the energization of their respective tripping circuits, while the embodiments of FIGS. 6 and 7 utilize the curve relationship $A - B = C$ and $A - C = B$ respectively for controlling their respective tripping circuits.

As illustrated in FIG. 4, the current in the power circuit 32 is sensed by a current transformer CT, the secondary of which energizes a loading resistor R. The primary of the transformer is preferably tapped so that the voltage quantity established across the resistor R provides the proper relationship of the control quantity supplied to the rectifier and filter network 34 of the relay 30. The network 34 comprises a rectifying circuit including the amplifier A1 and a filtering circuit including the amplifiers A2 and A3. These amplifiers, as well as the amplifiers A4–A10, may be operational amplifiers of the type sold under the designation SN-72747. Each amplifier will, of course, have its power input terminals energized from the + 15 or + 15 volt busses as required. The rectified direct potential output voltage of the network 34 is the voltage C as set forth above.

The voltage C is supplied to the instantaneous trip comparator or network 36, the summing network 38 and the pick-up comparator or network 40. At magnitudes of the voltage C below pick-up magnitude, the output voltage of the amplifier A7 of the network 40 provides positive voltage or logical 1 signal to the diode $D_1$ of the ramp generator network 42 which maintains the transistor $Q_1$ conducting and thereby shunts the current from the constant current source 44 around the connected one of the capacitors $C_X$. This keeps the + input terminal of the amplifier A6 of the segment slope generator network 44 at zero or ground potential and the output voltage D of the amplifier A6, as well as the output voltage of the amplifier A8, are also maintained substantially at ground potential. The ground voltage D is supplied to the + input terminal of the amplifier A9 of the slope generating network 44 whereby its output voltage B is also maintained substantially at ground potential.

The magnitude of the segment bias voltage A of the segment bias generator 45 is determined by a voltage dividing network 47 connected between the + 15 volt supply and the ground or neutral potential. The voltage dividing network 47 includes a first or common resistor 48 connecting the + 15 volt supply to a bus 49 and 8 individual resistors which connect the bus 49 to the ground or neutral potential through individual transistor switches. Conveniently, seven of these switches may be the seven NPN transistors of a CA 3081 transistor array 50 and the eighth switch a discrete NPN transistor 51. The bases of the NPN transistor switches are connected to the 4 bit counter 46 through a decoder 52 which for example may be of the SN7442 type.

As the counter is actuated, the decoder sequentially provides a logical 0 signal at its output pins 1–7 and 9. This logical 0 signal is inverted by the inverters associated with these pins and applied as logical 1 signals to sequentially render conducting the NPN transistors of the array 50 and the discrete transistor 51. At the ninth pulse of the counter, the decoder resets to its initial or count zero condition. The magnitude of the individual resistors of the network 47 are so proportioned that the voltage on bus 49 will provide the voltage segments A of FIGS. 1–3.

The magnitude of the slope voltage B is a portion of the output voltage D of the amplifier A6 as determined by a voltage dividing network 54 connected between the output terminal of the amplifier A6 and the ground or neutral potential. This dividing network is similar to the network 47 and comprises a first or common resistor 55 connecting a bus 56 to the output terminal of amplifier A6 and 8 individual resistors which connect the bus 56 to ground through 8 individual transistor switches. Conveniently, seven of these switches may be the seven NPN transistors of a CA3081 transistor array 57 and the eighth switch a discrete NPN transistor 58. The logical 0 output signals of the decoder 52 are inverted and sequentially render conducting the NPN transistors of the array 57 and the discrete transistor 58 as described above in connection with the segment bias generator 45.

The slope generator 44 is energized from the output of the ramp generator 42. The output potential of the ramp generator 42 is determined by the potential across the capacitor network 60, as limited by the effect of amplifier A8. When the shorting transistor $Q_1$ is non-conductive, the constant current source will the capacitor network 60 at a constant rate as determined by the setting of the switches associated therewith, in this instance, the connected capacitor $C_X$.

Figure 2:
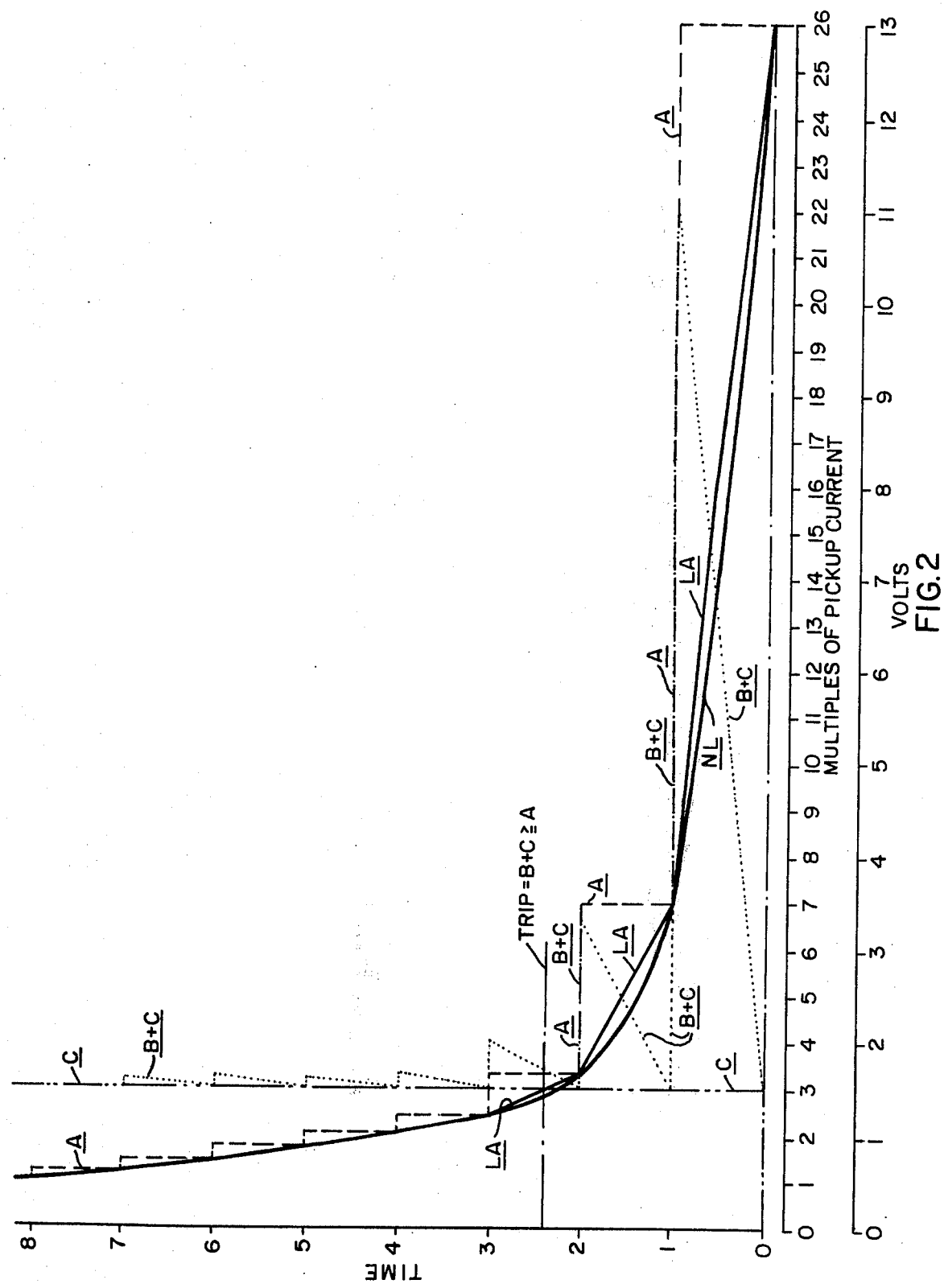
Figure 3:
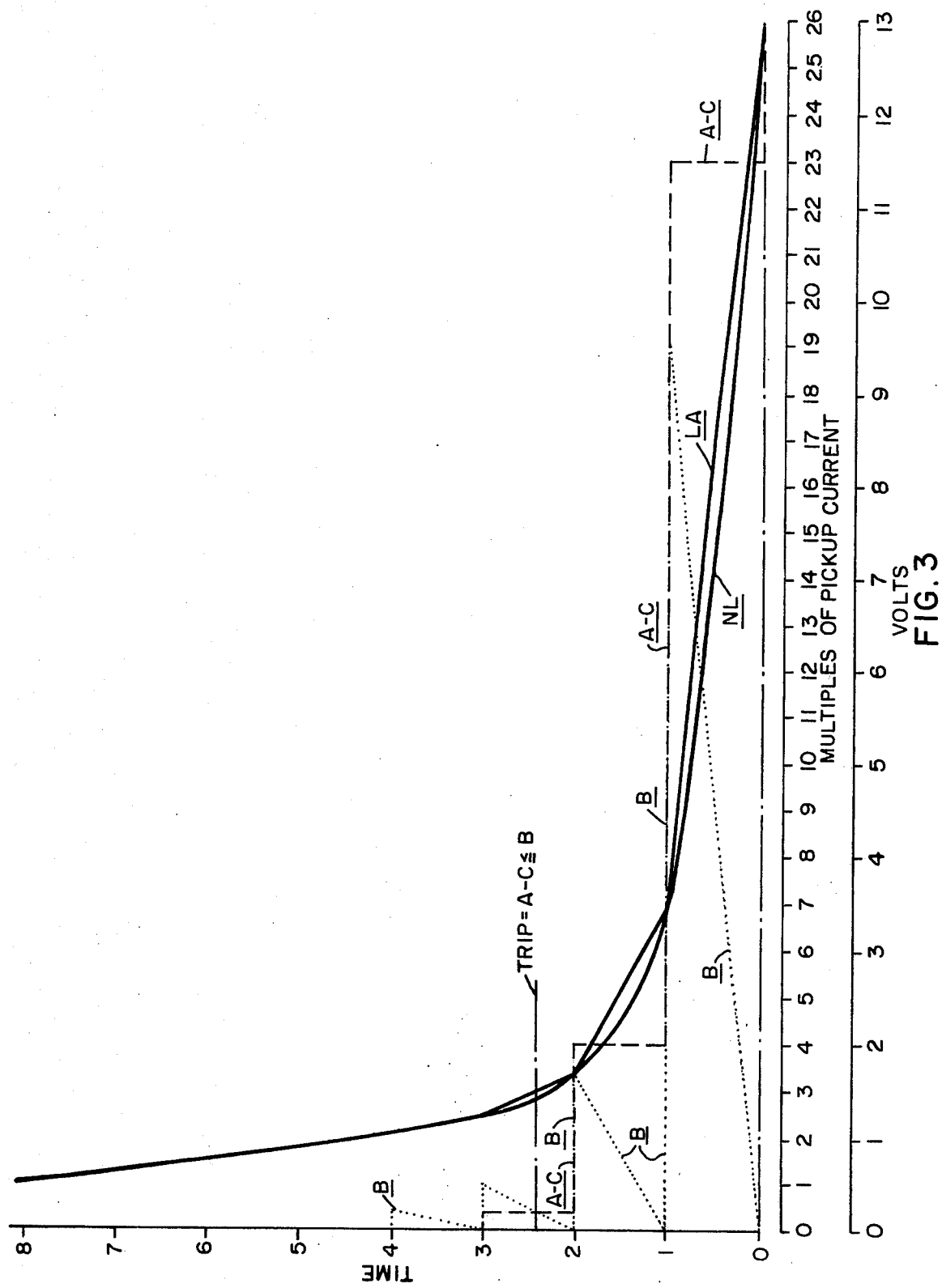

When the current in the power circuit 32 increases to some value in excess of the pick-up setting (the maximum desired current of the power circuit), the pick-up network 40 will terminate the logical 1 signal to the diode D1 of the ramp generator 42. The transistor $Q_1$ will thereupon become non-conducting and the voltage across the capacitor network 60 will increase at a predetermined rate. Initially, the NPN transistor of the array 57 associated withthe output terminal 1 of the decoder 52 will be conducting and the voltage dividing network 54 will provide the maximum ratio between the voltage output of the ramp generator 42 and the bus 56. This results in an output voltage B as indicated in FIGS. 1 and 3 during the time interval 0 – 1. During this same interval, the output terminal 1 of the decoder 52 will be maintaining the NPN transistor of the array 50 associated therewith in its conducting condition to provide the maximum voltage on the bus 49 of the voltage dividing network 47 to provide the bias voltage A (FIGS. 1 and 2). In the form shown in FIG. 2, the voltages B and C are added to provide the wave shape B + C during the time interval 0 – 1.

When the voltage across the capacitor network 60 reaches a critical value (in this case 5 volts), the amplifier A8 changes its output voltage condition from its low to its high state. The output voltage condition of inverter 62 will thereupon change from its high to its low state causing a capacitor 63 to momentarily lower the potential of the base of a normally conducting transistor 64 to become non-conducting whereby the collector thereof momentarily assumes $a + 5$ volt potential. This coupled with the effect of the inverter 65, causes a flow of base current of the transistor $Q_1$ through the diode D2. Transistor $Q_1$ conducts and rapidly discharges the capacitor network 60 to initiate a subsequent recharging of the network 60.

The momentary positive pulse resulting at the collector of the transistor 64 provides a counting pulse to the input terminal 2 of the segment counter 46. The change in state of the counter 46 is decoded by the segment decoder 52 and results in the termination of the logical 0 signal at its output terminal 1 and the provision of a logical 0 signal at its output terminal 2.

During the next time interval 1–2, the next of the NPN transistors of the arrays 50 and 57 will be rendered conducting. The voltage dividing network 47 will now apply a lesser voltage to the bus 49 and the segment bias voltage A is reduced to the value shown in FIGS. 1 and 2 during the time interval 1–2. The voltage dividing network 54 will now apply a lesser percentage of the output voltage of the ramp generator to the bus 56 and the slope voltage will increase at a lesser rate to limit the slope voltage B to the value shown in FIGS. 1 and 3 during the time interval 1–2.

At the time 2, the ramp generator 42 is again reset and the segment counter 46 reactuated to provide the time interval 2–3 and the bias voltage A (see time 2–3 of FIGS. 1 and 2) and the slope voltage B (see time 2–3 of FIGS. 1 and 3).

Assuming a line current of three times the pick-up value as illustrated in FIGS. 1, 2 and 3 and from $B + C = A$ of FIGS. 2 and 4, the cycling as above described will continue into the time interval 3–4 and a trip signal will be established when the curve $B + C$ crosses the curve A. In the forms $A - B = C$ and $A - C = B$ (FIGS. 1 and 6 and 3 and 7), the summing and comparing are somewhat different because of the different transpositions of the mathematical formula, but in each instant the trip signal occurs at the time instant when the curve A-B intersects the curve C and the curve A-C intersects the curve B, which from inspection is the same instant in time after initiation of the relay 30.

When the curves intersect, the trip comparator 68 forwards a the flip-flop 70. This provides an energizing signal to the trip circuit (not shown) and a resetting signal to the counter 46.

In many instances, a separate instantaneous trip actuation is desired. For this purpose, the network 36 is provided and is energized directly by the output voltage C of the rectifier and filter network 34. At line currents below the instantaneous trip value, the output of the amplifier A4 supplies a logical 1 signal through the isolation diode 72 to the trip comparator 68.

The relay 30' of FIG. 5 operates in substantially the same manner as the relay 30 of FIG. 4. The main difference between the two is in the ramp generator 42'. The generator 42' develops the ramp voltage digitally under control of a timer 80 having a digital output. As illustrated, this timer 80 comprises an operational amplifier A8 and a capacitor network 81 which is alternately charged and discharged to provide a series of digital output signals to drive the first 5 output terminals of two series connected 4-bit counter 82 and 83 which may for example be of the SN7493 type. The first 5 output terminals are connected through inverters to the input terminals 9, 8, 7, 6 and 5 respectively of a 6-bit multiplying digital-to-analog converter 84 which may be of the MC1406L type. The output terminal 4 of the converter 84 is connected to the input terminal of amplifier A6 of the slope generator 44'. The difference between the generators 44 and 44' is that amplifier A6 of generator 44' produces staircase-like ramp voltages versus linear ramp voltages in 44. The RC network in the feedback path of the amplifier A6 of the generator 44' is to smooth the staircase. This shunting capacitor is not necessary if a stepped wave is desired.

The last three output terminals of the counter 83 are connected to the input terminals 15, 14 and 13 of the SN7442 decoder of the segment decoder network 52'. The network 52 will control the segment generator 45 and the slope generator 44' as described above in connection with the same structure found in FIG. 4.

What is claimed and is desired to be secured by United States Letters Patent is as follows:

1. An inverse time-overcurrent relay for controlling an electric circuit, said relay comprising: input means adapted to be energized from said circuit for providing a first output quantity having a magnitude which is a function of the magnitude of the current in the electric circuit, a quantity magnitude comparing network having first and second inputs and an output, first circuit means operatively connecting said first input to said input means whereby said first input of said comparing network is energized by said first output quantity, a quantity magnitude generating means effective to alter the magnitude of a second output quantity in accordance with a predetermined pattern, said pattern comprising slope controlling means effective to change the magnitude of said second quantity at a different time rate, sequencing means connected to said generating means and effective to cause said generating means to progressively generate said rates in a sequence in which the magnitude of said second quantity progresses from a first to a second magnitude, second circuit means connecting said second input of said comparing network to said generating means for energizations by said second output quantity, said comparing network being effected to alter the conditions of its said output when the relative magnitudes of said quantities supplied to its said inputs reaches a desired relationship, and control means energized from said input means and effective when the magnitude of the current in said electric circuit reaches a predetermined minimum magnitude to render said generating means effective.

2. The relay of claim 1 in which said generating means includes a first generating means operable to provide a series of third electrical quantities, each said third quantity having an initial and a final value, a second generating means operable to provide a series of fourth electrical quantities, and a summing network for summing said third and said fourth quantities to provide said second quantity.

3. The relay of claim 2 in which each of said initial values are of equal magnitude and in which said final values are progressively of lesser magnitudes, and in which the magnitudes of said series of said fourth quantities are each of constant magnitude throughout the duration of each of said series with the magnitude of said series of said fourth quantities being progressively of lesser magnitudes.

4. A time-overcurrent relay comprising a first electrical quantity generating network operable to provide a first quantity which changes in magnitude from an initial to a final magnitude in a selected time interval, said network including a resetting means actuated by said first quantity at its said final magnitude to cause said network to provide a series of said first quantities, a second electrical quantity generating network energized by said first quantity and operable to provide a second electrical quantity which has a magnitude proportional to the instantaneous magnitude of said first quantity, said second generating network including proportionality controlling means for determining the proportionality of said second quantity with respect to the magnitude of said first quantity, a counting network actuated by said resetting means and operatively connected to said proportionality controlling means, said proportionality means being effective when actuated by said counting means to change said proportionality of said second quantity with respect to said first quantity, a third electrical quantity generating network operable to provide a third electrical quantity of determined magnitude, said third generating network including magnitude determining means for selecting the magnitude of said third quantity, said counting network being operatively connected to said magnitude determining means and effective when actuated by said counting network to change the magnitude of said third quantity, an input network for energization by a current derived quantity and effective to provide a fourth electrical quantity having a magnitude which is a function of said current derived quantity, summing means energized by two of said electrical quantities and providing a fifth quantity, and comparing means energized by the remaining one of said electrical quantities and said fifth quantity and providing an output signal when the sum of the magnitudes of said second and third electrical quantities is not less than the magnitude of said fourth electrical quantity.

5. The relay of claim 4 in which said two electrical quantities are said second and said fourth electrical quantities, said remaining one of said electrical quantities is said third electrical quantity and the magnitude of said fifth quantity is the total magnitude of said second and said fourth electrical quantities.

6. The relay of claim 4 in which said two electrical quantities are said second and said third electrical quantities, said remaining one of said electrical quantities is said fourth electrical quantity and the magnitude of said fifth quantity is the difference of the magnitudes of said second and said third electrical quantities.

7. The relay of claim 4 in which said first generating network comprises a current source and an energy storage means and a discharge means, said first network including circuit means connected to said storage means and providing said first quantity, said discharge means being actuated by said resetting means and effective to alter the energy in said storage means each time the magnitude of said first quantity reaches its said first magnitude.

8. A time-over current relay comprising first and second electrical quantity establishing networks, said first network being effective to provide an $n$ number of first quantities, each of said $n$ quantities having an initial magnitude and a final magnitude, said final magnitudes of said $n$ quantities being of progressively lesser magnitudes in the order progressing from a first of said $n$ quantities to this nth of said $n$ quantities, said second network being effective to provide an $n$ number of second quantities each of said $n$ second quantities being of substantially constant magnitude, the magnitudes of said $n$ second quantities being of progressively lesser magnitudes in the order progressing from a first of said $n$ second quantities to the nth of said second quantities, a pair of input terminals adapted to be energized with a third quantity proportioned to the magnitude of current in a circuit to be controlled, and a summing network energized by two of said quantities and supplying a fourth electrical quantity which is the sum of the said two quantities, and a comparing network energized by said fourth quantity and the remaining one of said first and second and third quantities, said comparing network providing a control signal when the magnitudes of said first and second and third quantities satisfy one arrangement of the mathematical relationship in which the sum of the magnitudes of said first and said third quantities is not less than the magnitude of said second quantity.

9. The relay of claim 8 in which the magnitude of said first of said n second quantities is substantially equal to the magnitude of said third quantity at its zero time delay quantity.

10. The relay of claim 9 in which the difference in magnitude of the magnitude of each of said $n$ second quantities in sequence and the magnitude of each of said $n$ first quantities in sequence at said initial and said final magnitudes fall on a desired time-current curve.

11. The relay of claim 10 in which the duration of each of said $n$ quantities is equal.

12. The relay of claim 11 in which said initial magnitudes of each of said n first quantities are equal to each other and said final magnitudes of each of said $n$ first quantities in sequence equal the change in magnitudes of said n second quantities in sequence.

13. The relay of claim 12 in which the increase in magnitude of each said n first quantities from its said initial to its said final quantity approaches linearity.

14. A time-overcurrent relay for controlling the interruption of an electric circuit in substantial accordance with a predetermined time-to-trip vs. current magnitude curve, said relay comprising an electrical quantity establishing network, said network comprising means to establish an initial magnitude of its output quantity and to change the magnitude of said quantity at $n$ different rates, said network further including means to sequence said rates from a first thereof to the nth thereof, said rates being effective to change said magnitude of said quantity from said initial magnitude through $n-1$ magnitudes of said quantity to a final magnitude of said quantity according to said $n$ rates, quantity comparing means having a pair of inputs and an output, input means adapted to be energized from the electric circuit to be controlled and having an output energized in accordance with the magnitude of the current in said controlled circuit, and circuit means connecting one of said pair of inputs of said comparing means to said output of said input means and connecting the other of said pair of inputs of said comparing means to said network for energization by said quantity, said comparing means being effective to provide an interrupting signal at a predetermined relationship of the quantities supplied to its said pair of inputs.

15. A time over-current relay for controlling the interruption of an electric circuit in substantial accordance with a predetermined time-to-trip vs. current magnitude relationship said relay comprising a timing device for timing an $n$ number of time intervals, a quantity magnitude controlling device, said quantity controlling device being effective to establish an initial magnitude of said quantity and to establish $n$ subsequent lesser magnitudes of said quantity, said $n$ magnitudes being a function of the $n$ magnitudes of said current at which the interruption is to occur.

* * * * *